US008911566B2

(12) United States Patent
Saito et al.

(10) Patent No.: US 8,911,566 B2
(45) Date of Patent: Dec. 16, 2014

(54) NITROCARBURIZED CRANKSHAFT MEMBER AND STEEL FOR NITROCARBURIZED CRANKSHAFTS

(75) Inventors: Isamu Saito, Saitama-ken (JP); Yoshihiro Takitani, Saitama-ken (JP); Shinichiro Kato, Nagoya (JP); Makoto Hobo, Nagoya (JP); Keiichiro Kamiya, Nagoya (JP); Takahiro Miyazaki, Nagoya (JP); Takashi Kano, Tokyo (JP)

(73) Assignees: Honda Motor Co., Ltd., Tokyo (JP); Daido Steel Co., Ltd., Aichi (JP)

( * ) Notice: Subject to any disclaimer, the term of this patent is extended or adjusted under 35 U.S.C. 154(b) by 404 days.

(21) Appl. No.: 12/958,855

(22) Filed: Dec. 2, 2010

(65) Prior Publication Data

US 2011/0132138 A1 Jun. 9, 2011

Related U.S. Application Data

(60) Provisional application No. 61/353,018, filed on Jun. 9, 2010.

(30) Foreign Application Priority Data

Dec. 3, 2009 (JP) ................. 2009-275908

(51) Int. Cl.
*F16C 3/06* (2006.01)
*B21K 1/08* (2006.01)

(52) U.S. Cl.
CPC .... *F16C 3/06* (2013.01); *B21K 1/08* (2013.01)
USPC ............................................. 148/320; 75/595

(58) Field of Classification Search
CPC ................... B21K 1/08; F16C 3/06

USPC ................................................ 148/320; 75/595
See application file for complete search history.

(56) References Cited

U.S. PATENT DOCUMENTS

2007/0144619 A1* 6/2007 Asai et al. .................. 148/318

FOREIGN PATENT DOCUMENTS

| JP | 2001-254143 A | 9/2001 |
| JP | 2002-226939 A | 8/2002 |
| JP | 2007-197812 A | 8/2007 |
| JP | 2007231302 A * | 9/2007 |

OTHER PUBLICATIONS

Machine translation of JP 2007231302A, Sep. 2007.*
M. Hobo and K. Takada, "Effect of Small Amounts of Cu on Nitrocarburizing Characteristics for Medium-Carbon Steels," Research & Development Lab, Diado Steel Co., Ltd., Aug. 1, 2006.

* cited by examiner

*Primary Examiner* — Jie Yang
(74) *Attorney, Agent, or Firm* — Birch, Stewart, Kolasch & Birch, LLP

(57) ABSTRACT

A nitrocarburized crankshaft member made of a steel that includes C in an amount by weight of 0.25 to 0.32% as a required element and an optional element that may be included, and Fe and inevitable impurities in a remaining portion. The steel-made crankshaft member mainly includes ferrite and perlite, wherein at least a portion of the steel surface thereof having a ferrite surface area of 50% or greater is imparted with a nitrocarburized hard layer. The nitrocarburized hard layer includes a surface compound layer suppressed to a thickness of 10 to 35 μm, and a nitrogen diffusion zone below the surface compound layer having a diffusion depth of 700 μm or greater. The steel includes C, Si, Mn, Cu, Ni, and Cr as the required elements and Mo, N, s-Al, and Ti as the optional elements.

6 Claims, 3 Drawing Sheets

| | C | Si | Mn | P | S | Cu | Ni | Cr | Mo | s-Al | Ti | N | Ceq*1 | Ceq*2 | Ni/Cu |
|---|---|---|---|---|---|---|---|---|---|---|---|---|---|---|---|
| min | 0.25 | 0.01 | 0.55 | | 0.040 | 0.10 | 0.05 | 0.10 | | | | | 0.380 | 0.430 | 0.50 |
| max | 0.32 | 0.15 | 0.80 | 0.030 | 0.150 | 0.60 | 0.30 | 0.20 | 0.05 | 0.020 | 0.020 | 0.020 | 0.470 | 0.530 | 1.00 |
| Embodiment 1 | 0.25 | 0.10 | 0.75 | 0.021 | 0.048 | 0.15 | 0.15 | 0.15 | 0.02 | – | – | 0.020 | 0.451 | 0.469 | 1.00 |
| Embodiment 2 | 0.29 | 0.11 | 0.67 | 0.013 | 0.062 | 0.20 | 0.10 | 0.11 | 0.01 | 0.005 | 0.007 | 0.015 | 0.419 | 0.486 | 0.50 |
| Embodiment 3 | 0.29 | 0.09 | 0.70 | 0.012 | 0.062 | 0.14 | 0.08 | 0.16 | 0.01 | 0.008 | 0.009 | 0.016 | 0.468 | 0.485 | 0.57 |
| Embodiment 4 | 0.26 | 0.09 | 0.66 | 0.012 | 0.058 | 0.14 | 0.08 | 0.11 | 0.01 | 0.008 | 0.011 | 0.015 | 0.395 | 0.438 | 0.57 |
| Embodiment 5 | 0.29 | 0.06 | 0.67 | 0.013 | 0.057 | 0.19 | 0.10 | 0.14 | 0.01 | 0.002 | 0.008 | 0.014 | 0.446 | 0.487 | 0.53 |
| Embodiment 6 | 0.30 | 0.13 | 0.69 | 0.012 | 0.058 | 0.19 | 0.10 | 0.11 | 0.01 | 0.009 | 0.010 | 0.015 | 0.429 | 0.499 | 0.53 |
| Embodiment 7 | 0.29 | 0.10 | 0.77 | 0.006 | 0.061 | 0.14 | 0.07 | 0.10 | 0.02 | 0.010 | 0.009 | 0.015 | 0.416 | 0.485 | 0.50 |
| Embodiment 8 | 0.26 | 0.04 | 0.66 | 0.012 | 0.061 | 0.25 | 0.13 | 0.13 | 0.01 | 0.002 | 0.010 | 0.015 | 0.421 | 0.468 | 0.52 |
| Comparison Example 11 | 0.36 | 0.10 | 0.45 | 0.006 | 0.060 | 0.14 | 0.07 | 0.12 | 0.01 | 0.009 | 0.011 | 0.015 | 0.424 | 0.507 | 0.50 |
| Comparison Example 12 | 0.29 | 0.07 | 0.77 | 0.015 | 0.059 | 0.24 | 0.14 | 0.16 | 0.02 | 0.005 | 0.007 | 0.017 | 0.493 | 0.528 | 0.58 |
| Comparison Example 13 | 0.31 | 0.06 | 0.71 | 0.016 | 0.062 | 0.26 | 0.12 | 0.21 | 0.02 | 0.006 | 0.011 | 0.018 | 0.545 | 0.548 | 0.46 |
| Comparison Example 14 | 0.24 | 0.08 | 0.72 | 0.006 | 0.058 | 0.14 | 0.07 | 0.08 | 0.01 | 0.010 | 0.006 | 0.015 | 0.364 | 0.419 | 0.50 |
| Comparison Example 15 | 0.35 | 0.13 | 0.68 | 0.010 | 0.700 | 0.23 | 0.15 | 0.14 | 0.02 | 0.004 | 0.009 | 0.014 | 0.498 | 0.583 | 0.65 |
| Comparison Example 16 | 0.30 | 0.13 | 0.69 | 0.012 | 0.058 | 0.19 | 0.10 | 0.35 | 0.01 | 0.009 | 0.00 | 0.012 | 0.669 | 0.547 | 0.53 |
| Comparison Example 17 | 0.29 | 0.09 | 0.70 | 0.012 | 0.062 | 0.03 | 0.03 | 0.12 | 0.01 | 0.008 | 0.00 | 0.015 | 0.418 | 0.447 | 1.00 |
| Comparison Example 18 | 0.25 | 0.07 | 0.65 | 0.015 | 0.059 | 0.11 | 0.30 | 0.02 | 0.02 | 0.005 | 0.008 | 0.014 | 0.298 | 0.443 | 2.73 |

| | C | Si | Mn | P | S | Cu | Ni | Cr | Mo | s-Al | T | N | Ceq*1 | Ceq*2' | Ni/Cu |
|---|---|---|---|---|---|---|---|---|---|---|---|---|---|---|---|
| min. | 0.25 | 0.01 | 0.55 | | 0.040 | 0.10 | 0.05 | 0.10 | | | | | 0.380 | 0.430 | 0.50 |
| max. | 0.32 | 0.15 | 0.90 | 0.030 | 0.150 | 0.60 | 0.30 | 0.20 | 0.05 | 0.020 | 0.020 | 0.020 | 0.470 | 0.530 | 1.00 |
| Embodiment 1 | 0.25 | 0.10 | 0.75 | 0.021 | 0.048 | 0.15 | 0.15 | 0.15 | 0.02 | -- | -- | 0.020 | 0.451 | 0.469 | 1.00 |
| Embodiment 2 | 0.29 | 0.11 | 0.67 | 0.013 | 0.062 | 0.20 | 0.10 | 0.11 | 0.01 | 0.005 | 0.007 | 0.015 | 0.419 | 0.486 | 0.50 |
| Embodiment 3 | 0.29 | 0.09 | 0.70 | 0.012 | 0.062 | 0.14 | 0.08 | 0.16 | 0.01 | 0.008 | 0.009 | 0.016 | 0.468 | 0.485 | 0.57 |
| Embodiment 4 | 0.26 | 0.09 | 0.66 | 0.012 | 0.058 | 0.14 | 0.08 | 0.11 | 0.01 | 0.008 | 0.011 | 0.015 | 0.395 | 0.438 | 0.57 |
| Embodiment 5 | 0.29 | 0.06 | 0.67 | 0.013 | 0.057 | 0.19 | 0.10 | 0.14 | 0.01 | 0.002 | 0.008 | 0.014 | 0.446 | 0.487 | 0.53 |
| Embodiment 6 | 0.30 | 0.13 | 0.69 | 0.012 | 0.058 | 0.19 | 0.10 | 0.11 | 0.01 | 0.009 | 0.010 | 0.015 | 0.429 | 0.499 | 0.53 |
| Embodiment 7 | 0.29 | 0.10 | 0.77 | 0.006 | 0.061 | 0.14 | 0.07 | 0.10 | 0.02 | 0.010 | 0.009 | 0.015 | 0.416 | 0.485 | 0.50 |
| Embodiment 8 | 0.26 | 0.04 | 0.66 | 0.012 | 0.061 | 0.25 | 0.13 | 0.13 | 0.01 | 0.002 | 0.010 | 0.015 | 0.421 | 0.468 | 0.52 |
| Comparison Example 11 | 0.36 | 0.10 | 0.46 | 0.006 | 0.060 | 0.14 | 0.07 | 0.12 | 0.01 | 0.009 | 0.011 | 0.015 | 0.424 | 0.507 | 0.50 |
| Comparison Example 12 | 0.29 | 0.07 | 0.77 | 0.015 | 0.059 | 0.24 | 0.14 | 0.16 | 0.02 | 0.005 | 0.007 | 0.017 | 0.493 | 0.528 | 0.58 |
| Comparison Example 13 | 0.31 | 0.06 | 0.71 | 0.016 | 0.062 | 0.26 | 0.12 | 0.21 | 0.02 | 0.006 | 0.011 | 0.018 | 0.545 | 0.548 | 0.46 |
| Comparison Example 14 | 0.24 | 0.08 | 0.72 | 0.006 | 0.058 | 0.14 | 0.07 | 0.08 | 0.01 | 0.010 | 0.006 | 0.015 | 0.364 | 0.419 | 0.50 |
| Comparison Example 15 | 0.36 | 0.13 | 0.68 | 0.010 | 0.700 | 0.23 | 0.15 | 0.14 | 0.02 | 0.004 | 0.009 | 0.014 | 0.498 | 0.583 | 0.65 |
| Comparison Example 16 | 0.30 | 0.13 | 0.69 | 0.012 | 0.058 | 0.19 | 0.10 | 0.35 | 0.01 | 0.009 | 0.00 | 0.012 | 0.669 | 0.547 | 0.53 |
| Comparison Example 17 | 0.29 | 0.09 | 0.70 | 0.012 | 0.062 | 0.03 | 0.03 | 0.12 | 0.01 | 0.008 | 0.00 | 0.015 | 0.418 | 0.447 | 1.00 |
| Comparison Example 18 | 0.25 | 0.07 | 0.65 | 0.015 | 0.059 | 0.11 | 0.30 | 0.02 | 0.02 | 0.005 | 0.008 | 0.014 | 0.298 | 0.443 | 2.73 |

Fig. 5

| | Thickness of Compound Layer (Dc) | | Maximum Hardness of Diffusion Zone (Hd) | | Hardness of Core Portion (Hb) | | Hd/Hb | | Diffusion depth of Diffusion Zone (Dd) | | Ferrite Area Percentage | |
|---|---|---|---|---|---|---|---|---|---|---|---|---|
| min | 10 μm | | HV280 | | HV160 | | 1.65 | | 700 μm | | 50% | |
| max. | 35 μm | | HV330 | | HV190 | | – | | – | | 80% | |
| Embodiment 1 | 23 | ○ | 321 | ○ | 163 | ○ | 1.97 | ○ | 990 | ○ | 63% | ○ |
| Embodiment 2 | 28 | ○ | 288 | ○ | 165 | ○ | 1.75 | ○ | 830 | ○ | 61% | ○ |
| Embodiment 3 | 30 | ○ | 339 | ○ | 165 | ○ | 2.05 | ○ | 750 | ○ | 58% | ○ |
| Embodiment 4 | 31 | ○ | 288 | ○ | 160 | ○ | 1.81 | ○ | 820 | ○ | 64% | ○ |
| Embodiment 5 | 30 | ○ | 330 | ○ | 165 | ○ | 2.00 | ○ | 1010 | ○ | 55% | ○ |
| Embodiment 6 | 27 | ○ | 328 | ○ | 166 | ○ | 1.97 | ○ | 1060 | ○ | 53% | ○ |
| Embodiment 7 | 28 | ○ | 313 | ○ | 165 | ○ | 1.90 | ○ | 870 | ○ | 59% | ○ |
| Embodiment 8 | 20 | ○ | 309 | ○ | 163 | ○ | 1.89 | ○ | 1010 | ○ | 63% | ○ |
| Comparison Example 11 | 28 | ○ | 285 | ○ | 167 | ○ | 1.70 | ○ | 900 | ○ | 57% | ○ |
| Comparison Example 12 | 27 | ○ | 348 | × | 170 | ○ | 2.05 | ○ | 1150 | ○ | 54% | ○ |
| Comparison Example 13 | 26 | ○ | 346 | × | 172 | ○ | 2.01 | ○ | 1090 | ○ | 57% | ○ |
| Comparison Example 14 | 29 | ○ | 282 | ○ | 158 | × | 1.79 | ○ | 690 | × | 68% | ○ |
| Comparison Example 15 | 19 | ○ | 340 | × | 176 | ○ | 1.93 | ○ | 1200 | ○ | 44% | × |
| Comparison Example 16 | 20 | ○ | 409 | × | 172 | ○ | 2.38 | ○ | 1130 | ○ | 43% | × |
| Comparison Example 17 | 37 | × | 307 | ○ | 161 | ○ | 1.91 | ○ | 940 | ○ | 60% | ○ |
| Comparison Example 18 | 28 | ○ | 259 | × | 160 | ○ | 1.62 | × | 640 | × | 72% | ○ |

NITROCARBURIZED CRANKSHAFT MEMBER AND STEEL FOR NITROCARBURIZED CRANKSHAFTS

CROSS REFERENCE TO RELATED APPLICATIONS

This nonprovisional application claims the benefit of U.S. Provisional Application No. 61/353,018 filed on Jun. 9, 2010 and to Patent Application No. 2009-275908 filed in Japan, on Dec. 3, 2009. The entire contents of all of the above applications is hereby incorporated by reference into the present application.

BACKGROUND OF THE INVENTION

1. Field of the Invention

The present invention relates to a nitrocarburized crankshaft member wherein at least a portion of the surface is nitrocarburized by a nitrocarburizing process, and a steel for nitrocarburized crankshafts that can be used therefor.

2. Description of the Background Art

In a reciprocating engine of an automobile or the like, a crankshaft is used to extract an output of rotating motion from a piston that linearly reciprocates. This crankshaft, as shown in the drawings of JP2007-197812A, for example, comprises a journal portion located around a shaft that is the same as the rotating shaft of an output shaft, a pin portion located around a shaft that moves the rotating shaft in parallel by a predetermined distance, and an arm portion provided in a plurality at a predetermined interval along the rotating shaft, connecting the journal portion and pin portion.

In the manufacturing method of this bent shape crankshaft, for example, a steel rod is hot-forged into the required shape, and this roughly formed shape is then machined into an integrated crankshaft member. Subsequently, as required, a normalizing process is carried out to remove residual stress, and a surface hardening process such as nitrocarburizing or nitriding is carried out to improve fatigue strength. During the forging or the surface hardening process, the crankshaft member is likely to bend or warp. Therefore, subsequently, a bending correction is carried out to correct bending, warping, and the like.

Any bends or warps of the crankshaft member is corrected by a bending correction bending the crankshaft member in the direction opposite the direction of the bend. At this time, cracks readily occur on the hard surface layer formed by a surface hardening process, such as nitrocarburizing or nitriding, and these cracks may cause damage to the crankshaft. Given this factor, a crankshaft member made of a steel that is superior in bending correctability, which makes it possible to perform a bending correction process without imparting excessive strain, has been in demand.

In response to such a demand, there have been developed steels for crankshafts that are made of a medium-carbon steel wherein the carbon content is suppressed to about 0.3 wt % to achieve a reduction in average hardness. For example, JP2002-226939A discloses a steel for nitrocarburized crankshafts that includes C in the amount of 0.2 to 0.6 wt %, Si in the amount of 0.05 to 1.0 wt %, Mn in the amount of 0.25 to 1.0 wt %, S in the amount of 0.03 to 0.2 wt %, Cr in the amount of 0.2 wt % or less, s-M in the amount of 0.045 wt % or less, Ti in the amount of 0.002 to 0.010 wt %, N in the amount of 0.005 to 0.025 wt %, and O in the amount of 0.001 to 0.005 wt %, and satisfies the condition $0.12 \times Ti$ wt %<O wt %<$2.5 \times Ti$ wt % and $0.04 \times N$ wt %<O wt %<$0.7 \times N$ wt %.

Now, from the viewpoints of cost and ease of manufacture, a solution strategy for the demand described above that proactively uses Cu, which may exist as a trapped element in scraps of raw material, is highly preferred. For example, the technical journal "DENKI-SEIKOU", Volume 77, No. 1 (February 2006), discloses that adding Cu to medium-carbon steel can increase ferrite hardness, improving yield strength, and form a harder yet thinner compound layer, which is formed by nitrocarburizing. That is, by adding Cu to a medium-carbon steel, the achievement of a nitrocarburized crankshaft member that is superior in bending correctability and superior in fatigue strength is expected.

Steels for nitrocarburized crankshafts made of a medium-carbon steel that include Cu are disclosed in JP2002-226939A, for example. This steel for nitrocarburized crankshafts includes C in an amount greater than or equal to 0.30 wt % and less than or equal to 0.50 wt %, Si in an amount greater than or equal to 0.05 wt % and less than or equal to 0.30 wt %, Mn in an amount greater than or equal to 0.50 wt % and less than or equal to 1.00 wt %, S in an amount greater than or equal to 0.03 wt % and less than or equal to 0.20 wt %, Cu in an amount greater than or equal to 0.05 wt % and less than or equal to 0.60 wt %, Ni in an amount greater than or equal to 0.02 wt % and less than or equal to 1.00 wt %, and Cr in an amount greater than or equal to 0.05 wt % and less than or equal to 0.30 wt %, and satisfies the condition that composition parameter F1>20 and F2>0 given $F1=185\,W_{Cr}+50\,W_{Cu}$, and $F2=8+4\,W_{Ni}+1.5\,W_{Cu}-44\,W_{Cr}$, where $W_{Cu}$, $W_{Ni}$, and $W_{Cr}$ are the content percentages (unit: wt %) of Cu, Ni, and Cr, respectively.

It is now expected that a crankshaft member that increases the performance requirements of crankshafts, excels in cost and ease of manufacture, and achieves both high fatigue strength and superior bending correctability will be developed.

The present invention was made in view of such circumstances, and it is therefore an object of the present invention to obtain a nitrocarburized crankshaft member having at least a portion of its surface subjected to nitrocarburizing, excels in cost and ease of manufacture, and achieves both high fatigue strength and superior bending correctability compared to prior art crankshaft members, and a steel for nitrocarburized crankshafts that can be used therefor.

SUMMARY OF THE INVENTION

The inventors discovered that a reduction in the amount of carbon in medium-carbon steel increases the bending correctability of a nitrocarburized crankshaft member and, with the addition of a predetermined amount of Cu in response to the reduction in yield strength caused by the decrease in the amount of carbon, achieves a crankshaft steel that is also superior in fatigue strength. The inventors further discovered that regulating the amount of added Cu to within a predetermined range in response to Ni, which significantly affects the surface-hardened layer produced by nitrocarburizing, suppresses the growth of a compound layer formed on the outermost surface of the surface-hardened layer. Here, the inventors conducted a large number of tests to assess the effects of other elements on the added amount of Cu, interpolating the effects between the elements of each test by multiple regression calculations, and finalized the invention. That is, according to the crankshaft steel of the present invention, a crankshaft member provided with a special surface-hardened layer produced by known nitrocarburizing can be achieved.

That is, the nitrocarburized crankshaft member according to the present invention is a member made of a steel having essentially ferrite and perlite, wherein the steel includes C in an amount by weight of 0.25 to 0.32% as a required element and an optional element that may be included, and Fe and inevitable impurities in the remaining portion, and at least a portion of the steel surface having a ferrite surface area of 50% or greater is imparted with a nitrocarburized hard layer, wherein: the steel includes C, Si, Mn, Cu, Ni, and Cr as the required elements, and Mo, N, s-Al, and Ti as the optional elements, in the amounts by weight of Si within the range of 0.01 to 0.15%, Mn within the range of 0.55 to 0.90%, Cu within the range of 0.10 to 0.60%, Ni within the range of 0.05 to 0.30%, Cr within the range of 0.10 to 0.20%, Mo within the range of 0.05% or less, N within the range of 0.020% or less, s-Al within the range of 0.020% or less, and Ti within the range of 0.020% or less, and satisfies the conditions that $0.43 \leq C_{eq} \leq 0.53$ where $C_{eq} = C+0.07 \times Si+0.16 \times Mn+0.19 \times Cu+0.17 \times Ni+0.2 \times Cr+0.4 \times Mo$, and $0.38 \leq C_{req} \leq 0.47$ where $C_{req} = 0.55 \times C+0.06 \times Si+0.18 \times Mn+0.09 \times Cu+0.47 \times Mo+1.0 \times Cr$; the Ni to Cu weight ratio is $0.50 \leq Ni/Cu \leq 1.00$; and the amounts by weight of P and S, which are inevitable impurities, are suppressed to 0.03% or less and 0.15% or less, respectively, thereby suppressing the thickness of a surface compound layer of the nitrocarburized hard layer to 10 to 35 μm while establishing a diffusion depth of a nitrogen diffusion zone below the surface compound layer of 700 μm or greater.

According to the invention, compared to prior art crankshaft members, both high fatigue strength and superior bending correctability can be achieved. That is, with a relatively low amount of carbon and the addition of a predetermined amount of Cu, it is possible to achieve a special nitrocarburized hard layer that increases yield strength and enhances fatigue strength while suppressing the thickness of the surface compound layer of the nitrocarburized hard layer to 10 to 35 μm and extending the diffusion depth of the nitrogen diffusion zone below the surface compound layer to 700 μm or greater. This special nitrocarburized hard layer can be achieved by adding at least the required elements C, Si, Mn, Cu, Ni, and Cr to the steel in predetermined amounts. In particular, since Cu can be added in an amount of 0.10 wt % or greater, it is possible to utilize trapped elements in scrap and further achieve a crankshaft that is superior in cost and ease of manufacture.

In the above-described invention, the HV ratio of the maximum hardness of the nitrogen diffusion zone, at a depth of at least 50 μm or greater from the surface compound layer, to the core hardness may be 1.65 or greater. According to the invention, both a higher fatigue strength and superior bending correctability of the crankshaft member can be achieved.

Further, in the above-described invention, the core hardness may be within the range of HV 160 to 190. Further, the maximum hardness of the nitrogen diffusion zone may be within the range of HV 280 to 330. In such a nitrocarburized crankshaft member provided with a special nitrocarburized hard layer as described above, both a higher fatigue strength and superior bending capability can be achieved.

Furthermore, the steel for nitrocarburized crankshafts according to the present invention is a steel having essentially ferrite and perlite, wherein the steel includes C in an amount by weight of 0.25 to 0.32% as a required element and an optional element that may be included, and Fe and inevitable impurities in the remaining portion, and has a ferrite surface area of 50% or greater, wherein: the steel includes C, Si, Mn, Cu, Ni, and Cr as the required elements and Mo, N, s-Al, and Ti as the optional elements, in the amounts by weight of Si within the range of 0.01 to 0.15%, Mn within the range of 0.55 to 0.90%, Cu within the range of 0.10 to 0.60%, Ni within the range of 0.05 to 0.30%, Cr within the range of 0.10 to 0.20%, Mo within the range of 0.05% or less, N within the range of 0.020% or less, s-Al within the range of 0.020% or less, and Ti within the range of 0.020% or less, and satisfies the conditions that $0.43 \leq C_{eq} \leq 0.53$ where $C_{eq} = C+0.07 \times Si+0.16 \times Mn+0.19 \times Cu+0.17 \times Ni+0.2 \times Cr+0.4 \times Mo$, and $0.38 \leq C_{req} \leq 0.47$ where $C_{req} = 0.55 \times C+0.06 \times Si+0.18 \times Mn+0.09 \times Cu+0.47 \times Mo+1.0 \times Cr$; the Ni to Cu weight ratio is $0.50 \leq Ni/Cu \leq 1.00$; and the amounts by weight of P and S, which are inevitable impurities, are suppressed to 0.03% or less and 0.15% or less, respectively.

According to the invention, compared to prior art crankshaft members, both high fatigue strength and superior bending correctability can be achieved. That is, with a relatively low amount of carbon and the addition of a predetermined amount of Cu, it is possible to make such a steel with increased yield strength and enhanced fatigue strength while suppressing the thickness of the surface compound of the nitrocarburized hard layer to a predetermined value or less and extending the diffusion depth of the nitrogen diffusion zone under the surface compound layer by a predetermined amount or more. This special nitrocarburized hard layer can be achieved by adding at least the required elements C, Si, Mn, Cu, Ni, and Cr to the steel in predetermined amounts. In particular, since Cu can be added in an amount of 0.10 wt % or greater, it is possible to utilize trapped elements in scrap and further achieve a crankshaft that is superior in cost and ease of manufacture.

BRIEF DESCRIPTION OF THE DRAWINGS

FIG. 5 is a table of the various test results of the steel for crankshafts of FIG. 1.

DESCRIPTION OF THE PREFERRED EMBODIMENTS

The following describes in detail several embodiments of the crankshaft member and steel for crankshafts therefor according to the present invention.

First, the manufacturing method of the crankshaft member will be described with reference to FIG. 2.

Figures 1, 2:
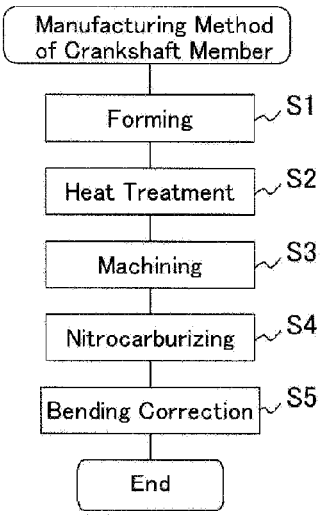
FIG. 1 is table of element compositions of steel for crankshafts of the present invention and comparative examples.
FIG. 2 is a flowchart of the manufacturing process of the crankshaft.

As indicated by the element compositions of FIG. 1, the steel for crankshafts of the embodiments is a medium-carbon steel that includes carbon in the relatively small amount of 0.25 to 0.32 wt %. One distinguishing characteristic of this steel is that the steel can include Cu which can exist as a trapped element in general raw material scrap as a required element.

The steel for crankshafts of the embodiments that consists essentially of ferrite and perlite is achieved by subjecting the steel of the element compositions of FIG. 1 to a forming process (S1), such as hot forging, as necessary in order to bring the steel closer to the shape of the final product (refer to FIG. 3) and then implementing heat treatment (S2), which includes controlled cooling.

This steel for crankshafts is then subjected to machining (S3) as necessary and subsequently a nitrocarburizing process (S4), which imparts a nitrocarburized hard layer on at least a portion of the surface, thereby obtaining the nitrocarburized crankshaft member of the embodiments.

Figure 3:
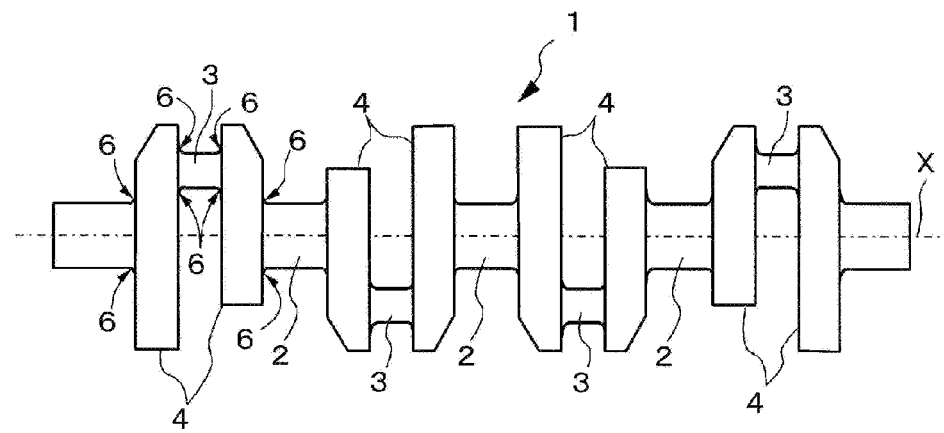
FIG. 3 is a plane view of the crankshaft.

As shown in FIG. 3, a crankshaft 1, which is the final product, comprises for example a journal portion 2 located around a shaft that is the same as a rotating shaft X of the output shaft, a pin portion 3 located around a shaft at a predetermined distance away from the rotating shaft X, and an arm portion 4 that is provided in a plurality at a predetermined interval along the rotating axis X, connecting the journal portion 2 and the pin portion 3.

The crankshaft 1 is subjected to nitrocarburizing on the connection portion of the journal portion 2 and the arm portion 4 where stress readily concentrates due to the bent shape thereof, and on base R portion 6 of the connection portion of the pin portion 3 and arm portion 4. In this nitrocarburizing process, nitrogen is diffused from the surface in order to increase the fatigue strength of the overall crankshaft 1.

After the nitrocarburizing process (S4), the nitrocarburized crankshaft member is subjected to a bending correction process (S5) as necessary. The bending correction process imparts bending strain in the direction opposite the bending direction.

Figure 4:
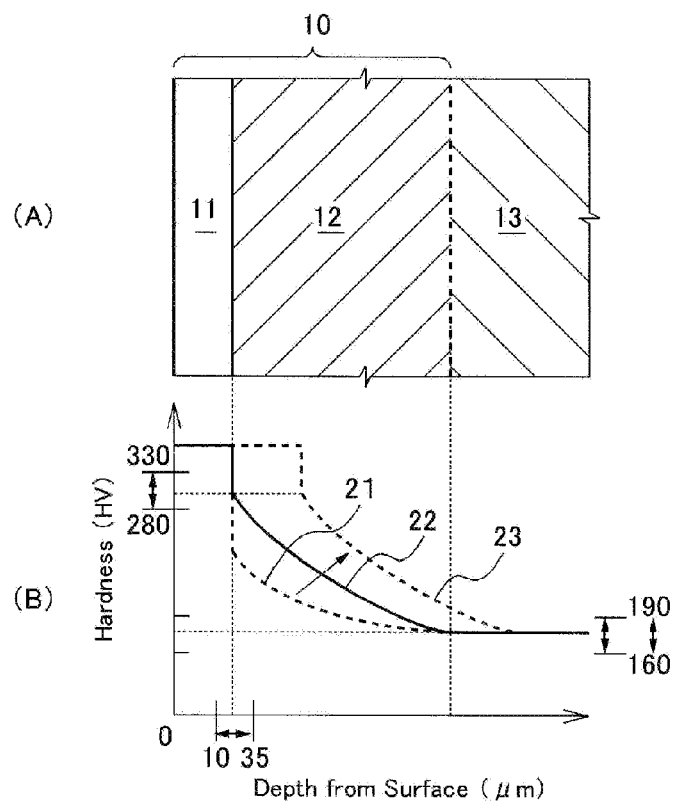
FIG. 4 is a diagram illustrating a cross section of the nitrocarburized hard layer of the crankshaft member according to the invention.

Next, the nitrocarburizing process (S4) will be described in detail. As illustrated in FIG. 4A, when nitrocarburizing is performed from the surface in the crankshaft steel having ferrite+perlite, a surface compound layer 11 comprising compounds including a nitride is formed on the outermost surface. Further, a nitrogen diffusion zone 12 of diffused nitrogen is formed on the inner side thereof. A core portion 13 keeps a structure, ferrite and perlite, of the crankshaft steel as is.

As illustrated in FIG. 4B, the surface compound layer 11 is extremely hard since it is made of compounds. The underlying nitrogen diffusion zone 12 is a zone in which the nitrogen which had passed through the surface compound layer 11 from the surface is diffused toward the inner portion, and thus comprises a hardness that is hardest on the side nearest the surface compound layer 11 and gradually decreases to the same hardness as the core portion 13. Note that the surface compound layer 11 and the nitrogen diffusion zone 12, which are slightly harder than the core portion 13, are also referred to as a surface-hardened layer 10.

To further increase the fatigue strength of the final crankshaft 1, it is preferable to increase the maximum hardness as well as the diffusion depth of the nitrogen diffusion zone 12. On the other hand, the surface compound layer 11 is hard and brittle and, thus to ensure that cracks do not occur, it is generally preferable to decrease the thickness while maintaining a constant hardness. The following describes how the surface-hardened layer 10 is formed by the nitrocarburizing process (S4) when improving the fatigue strength of the crankshaft 1.

As illustrated in FIG. 4B, the maximum hardness of the nitrogen diffusion zone 12 (the hardness directly underneath the compound layer 11) can be increased along with the diffusion depth by lengthening the execution time of nitrocarburizing (FIG. 2, S4). That is, a curve 21 of FIG. 4B can be changed to a curve 23. However, the thickness of the surface compound layer 11 also unfortunately increases.

Therefore, an experiment was conducted by performing nitrocarburizing on a steel that includes carbon in the amount of 0.25 to 0.32 wt %, which is a reduced amount of the carbon of medium-carbon steel, and contains added Cu to increase fatigue strength. The details thereof will now be described.

Each steel comprising the components shown in FIG. 1 was melted and steel-made in a high-frequency induction furnace to obtain an ingot (while the studied steel is a steel that includes C in the amount of 0.25 to 0.32 wt % with an added amount of Cu as described above. The figure also shows comparative examples 11 and 15 that are made of a steel that contains C in an amount greater than 0.32 wt %, and comparative example 14 that is made of a steel that includes C in an amount less than 0.25 wt %). Each ingot was coarsely forged to a size having a cross-section of 70 square millimeters, heated for a period of 90 minutes at 1200 degrees Celsius, and then hot forged to a size having a cross-section of 40 square millimeters. With an ending temperature of at least 950 degree Celsius or higher, the forged square rod was then control-cooled, particularly the rod being cooled from 700 to 600 degrees Celsius at a cooling rate of approximately 0.2 to 0.5 degrees Celsius per second. The rod was then subjected to a gas nitrocarburizing for 2 hours at 600 degrees Celsius (gas flow ratio $NH_3:N_2:CO_2=53:42:5$), and then quenched in an 80-degree Celsius oil bath to obtain each test piece.

Next, the effects of the nitrocarburizing process on the test pieces were measured. Each test piece was sliced, polished, and etched using a picral. The test pieces were then measured for the following: thickness (Dc) and hardness (Hc) of the surface compound layer 11, maximum hardness (hardness Hd at a depth of 50 μm from the surface compound layer 11) and diffusion depth (Dd) of the nitrogen diffusion zone 12, and core hardness (hardness Hb at a depth of 2 mm from the surface compound layer 11). Hardness was measured using a Vickers hardness tester. Additionally, the percentage of ferrite in the cross-section was found from an optical image by image analysis, and the ferrite area percentage was measured.

As a result of the above, a number of steels were found to still have a thin surface compound layer 11 yet a higher hardness and greater diffusion depth in the nitrogen diffusion zone 12 than prior art steel. For example, given an ideal specification L of the surface-hardened layer 10 of a crankshaft member, the following was found to be achievable:

a hardness (Dc) of the surface compound layer 11 of 10 to 35 μm or less, a maximum hardness (Hd) of the nitrogen diffusion zone 12 of HV 280 to 330, a diffusion depth (Dd) of the nitrogen diffusion zone 12 of 700 μm or greater, and a hardness (Hb) of the core portion 13 of HV 160 to 190.

As shown in FIG. 5, all steels other than comparative examples 14 and 18 satisfy the specification L for the diffusion depth (Did) of the nitrogen diffusion zone 12. While the embodiments satisfy the specification L for the thickness (Dc) of the surface compound layer 11, comparative example 17 does not. Further, only comparative example 14 does not satisfy the specification L for the hardness (Hb) of the core portion 13. Furthermore, the steels of comparative examples 12, 13, 15, 16, and 18 do not satisfy the specification L for maximum hardness (Hd) of the nitrogen diffusion zone.

Now, although Cu was added as described above, a Cu loss during hot forging was found to significantly impact the yield strength of the steel for crankshafts. In response, the addition of Ni by a specific quantity was tested. According to the tests, when Ni is included at a Ni to Cu weight ratio of $$0.50 \leq Ni/Cu \leq 1.00,$$

observations found that the Cu loss during hot forging can be suppressed.

Now, in the steels of the embodiments that satisfy the above-described specification L, the contributions of C, Si, Mn, Cu, Cr, and Mo, which are elements that can significantly impact the maximum hardness (Hd) of the nitrogen diffusion zone 12, are summarized in the equation below as the value $C_{req}$ by multiple regression calculation. That is:

$$C_{req} \text{ value} = 0.55 \times C + 0.06 \times Si + 0.18 \times Mn + 0.09 \times Cu + 0.47 \times Mo + 1.0 \times Cr \quad \text{(Equation 1)}$$

According to this equation, when the range of the $C_{req}$ value is 0.380 to 0.470, a steel for crankshafts of the group with the embodiments of FIG. 1 can be achieved. That is, particularly according to the nitrocarburizing process described above, a crankshaft member that satisfies the range of maximum hardness (Hd) of the nitrogen diffusion zone 12 of the specification L can be achieved.

On the other hand, the steels in comparative examples 12, 13, 15, 16, and 18 are out of the range of the maximum hardness (Hd) of the nitrogen diffusion zone 12 of the specification L, particularly as a result of the above-described nitrocarburizing. In these steels, the $C_{req}$ value is not within the range of 0.380 to 0.470. Conversely, aside from comparative example 14 which has a low amount of C, the steels in comparative examples 11 and 17 are within the range of the above-described maximum hardness (Hd) and have a $C_{req}$ value in the range of 0.380 to 0.470. This also confirms the relationship between the range of the $C_{req}$ value and the maximum hardness (Hd) of the nitrogen diffusion zone 12.

Next, the relationship between the fatigue strength of the crankshaft 1 and the yield strength of the steel for crankshafts will be described.

To further increase the fatigue strength of the final crankshaft 1, the yield strength of not only the nitrogen diffusion zone 12 but also the steel for crankshafts is preferably increased. However, increasing yield strength generally makes the bending correction process (S5) difficult to achieve. Hence, the hardness associated with yield strength needs to be at a certain level. That is, the hardness (Hb) of the above-described core portion 13 needs to be about 160 to 190 HV. With the above-described specification L, the hardness ratio of the hardness (Hb) of the core portion 13 to the maximum hardness (Hd) of the nitrogen diffusion zone 12 determines the hardness gradient within the nitrogen diffusion zone 12. The maximum hardness (Hd) is about 280 to 330 HV, with a hardness ratio (HV ratio) of 1.65 or greater.

Similar to the maximum hardness (Hd) of the nitrogen diffusion zone 12 by nitrocarburizing, the contributions of C, Si, Mn, Cu, Ni, Cr, and Mo, which are elements that can significantly impact the core hardness (Hb), are summarized in the equation below as the value $C_{eq}$ by multiple regression calculation. That is:

$$C_{eq} \text{ value} = C + 0.07 \times Si + 0.16 \times Mn + 0.19 \times Cu + 0.17 \times Ni + 0.2 \times Cr + 0.4 \times Mo \quad \text{(Equation 2)}$$

According to this equation, when the $C_{eq}$ value range is 0.430 to 0.530, a crankshaft member (crankshaft steel) that satisfies the above-described core hardness (Hb) can be achieved given a steel for crankshafts of the group with the embodiments of FIG. 1.

As shown in FIG. 5, excluding comparative examples 15 and 16, each of the crankshaft steels of the embodiments has a ferrite area percentage of 50% or higher. Note that when the ferrite area percentage exceeds 80%, the core hardness (Hb) lowers significantly, resulting in insufficient hardness of the crankshaft member as a whole.

From the above, it is confirmed that both high fatigue strength and superior bending correctability compared to prior art crankshaft members can be achieved when the crankshaft 1 is manufactured by executing the nitrocarburizing process as described above using a steel for crankshafts having an element composition shown in embodiments 1 to 8 of FIG. 1, in accordance with the process shown in FIG. 2.

The guidelines for obtaining the range of each component in the studies of the steels of the embodiments are as described below.

C, in the range of general medium-carbon steel, increases yield strength and enhances fatigue strength but does not achieve the bending correctability required by the nitrocarburized crankshaft member. The range, therefore, is 0.25 to 0.32 wt %.

Si improves fatigue strength and functions as a deoxidizing agent during steel welding. On the other hand, when Si is added in excess, a decrease in bending correctability results. Therefore, to ensure that Si does not affect the nitrocarburizing process, the amount is within the range of 0.01 to 0.15 wt %.

Mn, in general medium-carbon steel, improves the yield strength and enhances fatigue strength when added in a suitable range, and produces an Mn sulfide when combined with S, making it possible to improve machinability. The range, therefore, is 0.55 to 0.90 wt %.

S, in general medium-carbon steel, improves machinability, but can decrease toughness when added in excess. The range, therefore, is 0.040 to 0.150 wt %, preferably 0.040 to 0.070 wt %.

Cu improves the yield strength of steel as described above, achieves a thin compound layer in nitrocarburizing, and enhances fatigue strength when added in a suitable range. Further, from the viewpoint of cost and ease of manufacture, which are objects of the present invention, the amount of Cu as elements trapped in general scrap needs to be a certain amount or more. On the other hand, when Cu is added in excess, a decrease in hot workability results. The range, therefore, is 0.10 to 0.60 wt %, preferably 0.10 to 0.30 wt %.

Ni improves the ductility of perlite in the nitrogen diffusion zone, achieves a thin compound layer in nitrocarburizing, and improves bending correctability when added in a suitable range. On the other hand, when Ni is added excessively, the Ni decreases machinability and competes with the Cu in the decrease of compound layer thickness. The range, therefore, is 0.05 to 0.30 wt %.

Cr, in general medium-carbon steel, increases the strength and toughness of the steel, making it possible to improve fatigue strength, when added in a suitable range. The range, therefore, is 0.10 to 0.20 wt %.

Mo, in general medium-carbon steel, maintains hardness after nitrocarburizing and forging, increases the strength of the steel, and improves fatigue strength when added in a suitable amount. On the other hand, when Mo is added in excess, machinability decreases. The range, therefore, is 0.05 wt % or less.

Note that elements such as N, s-Al and Ti, can be included based on the purpose of addition, within a range that does not impact the effects achieved by the above-described required elements. For example, N, s-Al and Ti may be included in the amounts of 0.020 wt % or less, 0.020 wt % or less, and 0.020 wt % or less, respectively.

Furthermore, inevitable impurities that can be unavoidably included during manufacturing are preferably restricted as follows. That is, P may be included in the amount of 0.030 wt % or less.

Thus the present inventors discovered that reducing the amount of carbon in medium-carbon steel increases the bending correctability of a nitrocarburized crankshaft member and, by adding a predetermined amount of Cu in response to the decrease in yield strength caused by the decrease in the amount of carbon, achieves a crankshaft steel superior in fatigue strength. On the other hand, the growth of the compound layer formed on the outermost surface of the surface-hardened layer is suppressed by regulating the amount of Cu to within a predetermined range with respect to Ni, which has a significant effect on the surface-hardened layer achieved by nitrocarburizing. That is, regulating the amount of Cu achieves both a deeper nitrogen diffusion zone when a predetermined compound layer thickness similar to that of prior art is obtained, and a thinner compound layer when a nitrogen diffusion zone similar to that of prior art is obtained. As a result, both high fatigue strength and superior bending correctability of the crankshaft member can be achieved.

While the above has described representative embodiments of the present invention and modifications based thereon, the present invention is not limited thereto and suitable modifications can be made by those skilled in the art. It will be apparent to those skilled in the art that various modifications can be made in the present invention without departing from the spirit or scope of the present invention. For example, to further improve machinability, Pb, Bi, and Ca, which are elements known to have such an effect, may be added as well.

What is claimed is:

1. A nitrocarburized crankshaft member made of a steel comprising ferrite and perlite and at least a portion of a steel surface thereof having a ferrite surface area of 50% or greater is imparted with a nitrocarburized hard layer,
   wherein the steel consists of C, Si, Mn, Cu, Ni, and Cr as required elements, Mo, N, s-Al, and Ti as optional elements that may be included, and Fe and inevitable impurities,
   wherein the required elements and the optional elements are in amounts by weight of:
   C within a range of 0.25 to 0.32%,
   Si within the range of 0.01 to 0.15%,
   Mn within the range of 0.55 to 0.90%,
   Cu within the range of 0.10 to 0.60%,
   Ni within the range of 0.05 to 0.30%,
   Cr within the range of 0.10 to 0.20%,
   Mo within the range of 0.05% or less,
   N within the range of 0.020% or less,
   s-Al within the range of 0.020% or less, Ti within the range of 0.020% or less, and
   Fe and the inevitable impurities in a remaining portion, and satisfies the conditions that
   $0.430 \leq C_{eq} \leq 0.530$, where $C_{eq}=C+0.07 \times Si+0.16 \times Mn+0.19 \times Cu+0.17 \times Ni+0.2 \times Cr+0.4 \times Mo$, and
   $0.380 \leq C_{req} \leq 0.470$, where $C_{req}=0.55 \times C+0.06 \times Si+0.18 \times Mn+0.09 \times Cu+0.47 \times Mo+1.0 \times Cr$;
   a Ni to Cu weight ratio is $0.50 \leq Ni/Cu \leq 1.00$; and
   amounts by weight of P and S, which are inevitable impurities, are suppressed to 0.03% or less and 0.15% or less, respectively,
   wherein the nitrocarburized crankshaft member includes a thickness of a surface compound layer of the nitrocarburized hard layer of 10 to 35 μm formed during establishment of a diffusion depth of a nitrogen diffusion zone below said surface compound layer of 700 μm or greater.

2. The nitrocarburized crankshaft member according to claim 1, wherein an HV ratio of a maximum hardness of said nitrogen diffusion zone, at a depth of at least 50 μm or greater from said surface compound layer, to a core hardness is 1.65 or greater.

3. The nitrocarburized crankshaft member according to claim 2, wherein said maximum hardness of said nitrogen diffusion zone is within the range of HV 280 to 330.

4. The nitrocarburized crankshaft member according to claim 2, wherein said core hardness is within the range of HV 160 to 190.

5. The nitrocarburized crankshaft member according to claim 4, wherein said maximum hardness of said nitrogen diffusion zone is within the range of HV 280 to 330.

6. The nitrocarburized crankshaft member according to claim 1, wherein the steel includes Si in the amount by weight of 0.09%,
   Mn in the amount by weight of 0.70%,
   Cu in the amount by weight of 0.14%,
   Ni in the amount by weight of 0.08%, and
   Cr in the amount by weight of 0.16%.

* * * * *